United States Patent Office 3,640,954
Patented Feb. 8, 1972

3,640,954
TREATMENT OF POLYVINYL HALIDES
Paul Kraft, Spring Valley, N.Y., assignor to Stauffer Chemical Company, New York, N.Y.
No Drawing. Continuation-in-part of application Ser. No. 657,006, July 31, 1967. This application June 5, 1969, Ser. No. 830,872
Int. Cl. C08f 1/11, 1/13, 1/88
U.S. Cl. 260—45.95
5 Claims

ABSTRACT OF THE DISCLOSURE

Polyvinyl halides, particularly PVC, are made resistant to thermal degradation and plasticizer absorption by treating the latices with relatively polar, water-dispersible or water-soluble organo phosphates of the general formulae

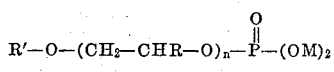
and
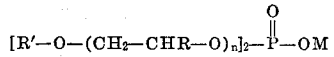

in which M is a metal cation or ammonium and particularly an alkali metal, $n$ is an integer from 1 to 30, R is hydrogen or lower alkyl of 1 to 2 carbons, and R' is alkyl or alkyl-substituted phenyl wherein the alkyl groups contain about 1 to 20 carbons. Preferably R' is either a straight chain alkyl group or a tertiary alkyl-substituted phenyl group wherein the alkyls total about 1 to 12 carbons. The polymers thus treated are especially useful in plastisols. Addition of the phosphate is made during or after the occurrence of the pressure drop in the polymerization of the polyvinyl chloride polymer.

CROSS-REFERENCE TO RELATED APPLICATION

This application is a continuation-in-part of application Ser. No. 657,006, filed July 31, 1967 for "Treatment of Polyvinyl Halides," now abandoned.

BACKGROUND OF THE INVENTION

This invention relates to a novel method for reducing the viscosity of plastisols made from polymeric resins, especially polyvinyl halides, and for improving the heat stability of films obtained from these fluxed plastisols. More particularly, it concerns preliminarily treating polyvinyl chloride latices in such a manner as to obtain polymer particles which do not so readily adsorb plasticizers as do the PVC polymers of the prior art which are not so treated. Since absorption of plasticizer by the polymer is thus reduced, less plasticizer is then required to be added to the polymer to obtain a plastisol of a given viscosity; or alternatively the same ratio of polymer to plasticizer as customary heretofore will result in a more fluid, workable plastisol. Of course, a major advantage of using less plasticizer is that fluxed films thereafter made may contain more polymer and thus exhibit better tensile strength. In addition, films derived from the plastisols treated according to the present invention exhibit enhanced thermal stability owing to the presence therein of the phosphate ester moiety of the organo phosphate treating agent.

The term "plastisol" denotes a fluid suspension of a resin in a non-volatile plasticizer. This plasticizer should be a poor solvent for the resin at ordinary temperatures but should dissolve it at elevated temperatures to form a gel, the resin and plasticizer remaining completely compatible in cooling. In practice the plastisol is molded, cast, dipped, extruded, etc., to the desired shape, heated and then cooled to produce the final article.

Polyvinyl chloride plastisols are especially useful in the preparation of dipped and moulded articles, films and coatings. The weight ratio of polymer to plasticizer therein is generally from 50/50 to 65/35. A good general purpose plastisol must have some fluidity at ambient temperatures and its viscosity should be in the range of from 1000 to 2500 centipoises at 25° C. for normal usage. Plastisols become less fluid and the rigidity of articles made from them increases as the amount of polymer in the plastisol is increased. Generally, as much polymer is desired as is possible without making the plastisol too viscous for working up.

Plastisol grades of polyvinyl chloride are made by emulsion polymerization. As the particle size of the emulsion polymerized polyvinyl chloride is increased, the fluidity of plastisols prepared therefrom is increased. Thus, a polymer having a particle diameter of less than 0.4 micron gives a plastisol of relatively high viscosity (ca. 50,000 to 100,000 centipoises at 25° C.) in a 60/40 blend of resin and di(2-ethyl hexyl) phthalate, whereas a resin having a particle diameter of 0.8 micron gives a low viscosity plastisol (ca. 4,000–10,000 centipoises at 25° C.) in a similar 60/40 blend of resin and plasticizer. (Particle diameters are average measurements based on the area of the particles.)

SUMMARY OF THE INVENTION

In its broader aspects the new process of this invention comprises adding to a polyvinyl halide latex, as the polymerization reaction nears completion, a small proportion of one or more of a new class of relatively polar, water-dispersible or water-soluble surfactants, intimately mixing the additive in the latex and then recovering the polymer particles from the aqueous system. The treated polymer is subsequently utilized in the preparation of plastisols which are characterized by markedly decreased viscosity. The new class of useful surfactants are organo phosphates of the general formulae and
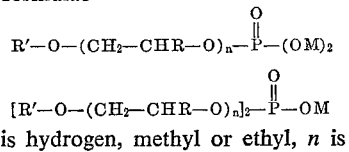

wherein R is hydrogen, methyl or ethyl, $n$ is an integer from 1 to 30, R' is alkyl or alkyl-substituted phenyl wherein the alkyl groups contain about 1 to 20 carbons, and M is either an ammonium or a metal cation. Preferably R' is straight chain alkyl or a tertiary alkyl-substituted phenyl wherein the alkyl groups have a total of about 1 to 12 carbons. Preferably, too, M is an alkali metal or alkaline earth metal. (Of course, in the above general formulae for the salts useful in this invention, if M has a valence of more than one, there is a corresponding simple change in the anion proportion.)

DETAILED DESCRIPTION OF THE INVENTION

According to preferred embodiments of this invention, one or more of the organo phosphates of the specified formulae is added to a conventionally prepared polyvinyl chloride latex in proportions ranging from about 0.05 to about 5% by weight, preferably in the range of approximately 0.5 to 2%, based on the total polymer content of the latex. It is required that the addition be made as polymerization nears completion. By near completion is meant when the pressure drop occurs during the normal polymerization of the vinyl chloride monomer in a suspension or emulsion process. In the event that addition occurs prior to this pressure drop, the emulsifier interferes with polymerization. As is well understood in this art, the pressure drop occurs at between about 65 and 85% conversion, usually around 75% conversion. Thus, mechanical agitation of some type is preferred for sufficient time to obtain intimate admixture, and somewhat elevated temperatures are desirable, for instance from 25° to 100° C., to speed the action of the viscosity depressant on the polymer particles in the aqueous system. The phosphate salt treating agent can be added as such or in a diluted form to an agitating reactor. Preferably, it is added in an aqueous solution at about 10% by weight concentration. The rate of addition is preferably slow in order to distribute the reagent evenly and prevent shocking of the latex. However, these particular depressants also act to enhance the mechanical stability of the latex once they are dispersed therein.

A critical characteristic of the useful organo phosphates is that they contain one or more of the alkylene oxide units as shown in the above structural formulae, i.e. ethylene, propylene or butylene units. It is believed that the combination of the repetition of the alkylene oxide units linked to the phosphate ester and the specified cations is responsible for the surprising effect of these materials in rendering the polymer particles so resistant to plasticizer absorption and in enhancing the thermal stability of the films derived therefrom.

The new method is applicable to any PVC latex regardless of surfactant used to prepare it (e.g. sodium lauryl sulfate, 2-ethyl hexyl sulfate), since the coating with these polar organo phosphates still renders the product resistant to plasticizer absorption. The particle size of the latex is also not critical to the success of this new treatment but may be readily varied within the skill of the art. A particle size of about 0.4 to 1.0μ will result in the most fluid plastisol. While for practical economic reasons the method is preferably applied to polyvinyl chloride latices, it is also useful in rendering absorption-resistant other types of polymers, for instance polyvinyl bromide, polyvinyl fluoride, polystyrene, polyacrylates and methacrylates polyvinyl acetate, copolymers of these, etc. The new treatment is effective, too, in other liquid systems besides latices having the polymerized particles dispersed therein. For example, the preformed polymeric resin in the desired particulate form may be resuspended in an aqueous medium and this suspension may then be contacted with the useful class of organo phosphate treating agents.

Preferred members of this generic class of organo phosphates, because of their relative economy and availability, are the water-soluble alkali metal and alkaline earth metal salts of those phosphoric acid esters wherein the repeated alkylene oxide unit is ethylene oxide, i.e. R is the above generic formulae is hydrogen, and R' groups are either straight-chain alkyls of about 1 to 12 carbons or tertiary alkyl-substituted phenyls wherein the alkyls total about 1 to 12 carbons. Especially useful phosphates are the sodium and potassium salts but also worthy of particular mention are the ammonium organo phosphates and the corresponding lithium, calcium, barium and zinc salts. A number of these preferred viscosity-depressing agents are available under such trade names as Gafac (products of General Aniline and Film), Ultra-Phos and Emcol (products of Witco) and the QS surfactants (Rohm & Haas). Specific formulae for some of these are given in Table I below in comparison with representative prior art surfactants which are not effective in the process of this invention. Most of these materials are supplied commercially as the free acids. To convert them to the required salt form it is necessary only to neutralize with the desired base in accordance with standard practice in the art.

From Table I it is readily apparent that the useful agents must have a repeated alkylene oxide unit in their structure. The structural formulae and chain length designations in this table and also in the following examples are approximate averages as determined by analysis.

TABLE I

| | Ineffective agents |
|---|---|
| (1) | Mixtures of $(RO)_2-\overset{O}{\underset{\|}{P}}-ONa$ and $RO-\overset{O}{\underset{\|}{P}}-(ONa)_2$ wherein R is n-octyl |
| (2) | (1) wherein R is 2-ethyl hexyl |
| (3) | (1) wherein R is decyl |

| | Effective agents |
|---|---|
| Gafac RE 610 | $[C_8H_{17}-\langle\phantom{x}\rangle-O(CH_2-CH_2O)_{8.5}]_x-\overset{O}{\underset{\|}{P}}-[OH]_{3-x}$ |
| Gafac RE 510 | Same as RE 610 except $-(CH_2-CH_2O)-$ is more than 15 |
| Ultra-Phos 11 | $[C_{12}H_{25}O(CH_2CH_2O)_{3.25}]_x-\overset{O}{\underset{\|}{P}}-[OH]_{3-x}$ |
| Ultra-Phos 12 | $[C_{10}H_{21}O(CH_2CH_2O)_{3.95}]_x-\overset{O}{\underset{\|}{P}}-[OH]_{3-x}$ |
| Ultra-Phos 21A | $[C_8H_{17}O(CH_2CH_2O)_{1.8}]_x-\overset{O}{\underset{\|}{P}}-[OH]_{3-x}$ |
| Emcol CS-136 | $[C_{8.7}H_{18.4}-\langle\phantom{x}\rangle-O(CH_2-CH_2O)_{5.0}]_x-\overset{O}{\underset{\|}{P}}-[OH]_{3-x}$ |
| Emcol CS-141 | $[C_9H_{19}-\langle\phantom{x}\rangle-O(CH_2CH_2O)_{9.3}]_x-\overset{O}{\underset{\|}{P}}-[OH]_{3-x}$ |
| Rohm & Haas QS-5 | $[R-\langle\phantom{x}\rangle-O(CH_2CH_2O)_5]_x-\overset{O}{\underset{\|}{P}}-[OH]_{3-x}$ | wherein R = 2,4,4-trimethyl-2-pentane

TABLE I—Continued

Ineffective agents

Rohm & Haas QS-7_____ Same as QS-5 but —(CH$_2$CH$_2$O)$_8$—

Rohm & Haas XQS-7___

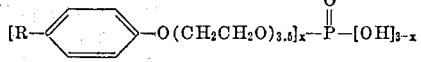

wherein R = 2,4,4-trimethyl-2-pentane

Emcol PS-222_____
$$[C_{12}H_{25}-O(CH_2CH_2O)_{2.5}]_x-\overset{O}{\underset{\|}{P}}-[OH]_{3-x}$$

NOTE.—In each instance $x$ represents the integers 1 and 2 and the agent is a mixture of both compounds, i.e. where $x=1$ and where $x=2$.

The following examples are given to illustrate this invention but not in any way to limit its scope.

Preparation A

Most commercially available surfactants of this class are liquids supplied as 100% active material. As previously mentioned, it is preferred to employ them as dilute aqueous solutions, conveniently at about 10% concentration, so as to prevent any "shocking" of the latex upon their addition. For this purpose the following technique is employed:

One hundred grams of the chosen treating agent are charged into a beaker followed by the addition of 900 grams of deionized water. The mixture is then stirred for 5 minutes and bottled. This 10% solution is now ready for addition to the latices.

Preparation B

Standard polyvinyl chloride latex is prepared to contain a particle size of about 0.4–0.9µ by the technique described for instance in British Pat. 627,265, namely polymerizing vinyl chloride emulsion in the presence of a small amount of a previously prepared polyvinyl chloride "seed" latex at temperatures from 40° C. to 68° C. in the presence of a conventional peroxygen catalyst, i.e. hydrogen peroxide. The emulsifying agent for the emulsion polymerization is a conventional anionic surface-active agent used in vinyl chloride polymerization, i.e. a soap of long chain fatty acids.

EXAMPLE I

To the latex of Preparation B is added a 10% solution of Ultra Phos 21 A sodium salt, having the structural formula $$[C_8H_{17}O(CH_2CH_2O)_{1.6}]_x-\overset{O}{\underset{\|}{P}}-[ONa]_{3-x}$$

sufficient of the 10% solution is added to provide 1% by weight (dry basis) of the reagent based on the total polymer content of the latex. The addition is effected after the pressure drop and slowly with gentle stirring over a 5–10 minute period. Upon completion of the depressant addition, the treated polymer is recovered by spray drying at 345° F. inlet temperature, 180° F. outlet temperature. The polyvinyl chloride latex is spray dried in a conventional spray drier, such as described in Perry's Chemical Engineers Handbook, 3rd edition, pp. 838–846, published by McGraw-Hill, New York (1950), and then ground in a conventional grinding mill (see Chemical Engineers Handbook, page 1116).

EXAMPLE II

To another sample of the latex of Preparation B is added sufficient dilute solution of the potassium salt of Emcol CS 141, in place of the sodium salt of Ultra-Phos 21A, to provide 1% by weight (dry basis). The latex is then treated as in Example I with respect to spray drying and grinding.

EXAMPLE III

Following the procedure of Examples I and II, the sodium salt of Emcol CS 136 is used in place of the Ultra-Phos 21A and Emcol CS 141 salts.

EXAMPLE IV (A) Following the procedure of Example I, a 10% solution of the sodium salt of QS-5 is used to treat the latext, and the product is then spray-dried and comminuted.

(B) The free acid form of QS-5 is neutralized to pH 7 with ammonium hydroxide and the resulting ammonium salt used in the procedure of Example IV(A) in lieu of the sodium salt. Substantially the same polymer product results.

EXAMPLE V

The free acid form of Gafac RE 510 is neutralized with calcium hydroxide. The resulting salt is used in three treatments of the PVC latex, following the procedure of Example I but employing in one case sufficient salt solution to provide 2% by weight of the PVC, in the second case sufficient to provide 0.5% and in the third instance 5.0% by weight. All three polymer products are characterized by markedly decreased plasticizer absorptivity and increased thermal stability.

EXAMPLE VI

The present invention is of advantage in making polyvinyl chloride plastisols with the various conventional plasticizers, e.g. dialkyl phthalates, e.g. di(2-ethyl hexyl phthalate), trialkyl phosphates, e.g. trioctyl phosphate; triaryl phosphates, tricresyl phosphate; dialkyl sebacates, e.g. dihexyl sebacate; dialkyl adipates, e.g. dioctyl adipate. This example illustrates the preparation of such plastisols.

The polymer samples of Examples I through III were mixed with 2-ethyl hexyl phthalate, also known as dioctyl phthalate (DOP) plasticizer, using a Hobart mixer and a ratio of 100 parts by weight of polymer to 60 parts of plasticizer. The plastisol viscosity values were measured with a Brookfield viscosimeter model RVF using a No. 6 spindle at 2 and 20 r.p.m.

The viscosity of the plastisol made from the polymer of Example I, containing the 1% Ultra-Phos 21A, is shown in Table II in comparison with a plastisol prepared from polymer treated with a commercial additive such as is described in U.S. Pat. No. 2,657,186, i.e. a polyoxyethylene lauryl ether having the formula $$CH_3(CH_2)_{11}-(OCH_2-CH_2)_3-OH$$

TABLE II

| | Viscosity in poises | | | |
|---|---|---|---|---|
| | After 2 hours | | After 24 hours | |
| Viscosity depressant | 2 r.p.m. | 20 r.p.m. | 2 r.p.m. | 20 r.p.m. |
| No depressant | 600 | 318 | 1,400 | 455 |
| Commercial polyoxyethylene lauryl ether | 575 | 380 | 1,050 | 980 |
| Ultra-Phos 21A | 73 | 130 | 75 | 105 |

In Table III are shown the results employing plastisols made from all of the products of Examples I through III plus a known, non phosphate-containing plastisol viscosity depressant and a plastisol containing no added depressant. Note the greatly improved properties exhibited by the products of this invention.

TABLE III.—EFFECT OF ORGANO PHOSPHATE SALTS ON PLASTISOL VISCOSITY AND HEAT STABILITY OF FILMS FORMED

| Plastisol | Viscosity in centipoises | | Color of 198° C. fluxed film after 20 min.[1] |
|---|---|---|---|
| | 2 r.p.m. | 20 r.p.m. | |
| As is, spray dried | 220,000 | | Dark brown. |
| 1% Ultra-Phos 21A salt added. | 36,000 | 28,000 | Light yellow. |
| 1% Emcol CS-136 salt added. | 32,000 | 30,000 | Do. |
| 1% Emcol CS-141 added. | 33,000 | 27,000 | Do. |
| 1% polyoxyethylene lauryl ether added. | 106,000 | 54,000 | Brown. |

[1] No heat stabilizer was added to either latex or plastisol prior to preparation of fluxed films.

EXAMPLE VII

The polymer sample of Example IV(A) was made up into a plastisol following the same procedure as in Example VI but employing 80 parts of DOP per 100 parts of the polymer. The comparative viscosities of this plastisol and of others similarly prepared from polymers treated with prior art additives are shown in Table IV. (Testing in this series was done in a Brookfield Plate and Cone Viscometer, Model HBT–2X.)

TABLE IV

| Additive | Additive structure | Viscosity in poises | | | | | |
|---|---|---|---|---|---|---|---|
| | | 1[1] | 2[1] | 5[1] | 10[1] | 20[1] | 40[1] |
| As is, no additive | | 414 | 269 | 162 | | | |
| Emery EMSORB 6915 | Polyoxyethylene (DP=20)[2] | 46 | 42 | 37 | 35 | 35 | |
| Emery EMSORB 2515 | Sorbitan monolaurate | 41 | 38 | 36 | 35 | 33 | |
| Baker Castor Oil Co. FLEXICIN 9 | Propyleneglycol monoricinoleate | 36 | 33 | 31 | 29 | 28 | |
| Rohm & Haas QS-5 salt | See Table I | 32 | 26 | 21 | 19 | 19 | 19 |
| Witco Ultra-Phos 21A salt | do | 32 | 28 | 25 | 24 | 25 | 26 |

[1] Revolutions per minute.
[2] Derivative of sorbitan monolaurate.

EXAMPLE VIII

Using the general procedure as outlined in Example I, several different latices were prepared. Each of the latex preparations were treated with different effective agents as outlined in Table I. In each instance, the organic phosphate emulsifier was added to the latex prior to the pressure drop during the polymerization process. The results are tabulated below:

TABLE V

| Phos. surf. used as sodium salt | Percent conv. | Mechan. latex stab. | Percent wet gum | Part. size, μ | Mol. wt. | Percent surfac. used on monomer |
|---|---|---|---|---|---|---|
| Gafac 510 | 8 | Bad | Floc | .3–.4 | | 0.45 |
| Gafac 610 | 24 | Bad | 80–90 | .3–.6 | | 0.45 |
| Ultra-Phos 12 | 100 | Bad | Floc | | | 0.45 |
| Ultra-Phos 21A | 100 | Bad | Floc | | | 0.45 |
| Emcol CS-136 | 2.7 | No reaction | | | | 0.45 |
| Emcol CS-141 | 3.2 | do | | | | 0.45 |
| Rohm & Haas QS-5 | 3.7 | do | | | | 0.45 |
| Rohm & Haas QS-7 | 22 | Poor | | .2 | | 0.45 |

As can be seen from the results indicated in Table V, it is required that the organic phosphate emulsifiers be added at near completion or after the pressure drop during normal polymerization procedures.

What is claimed is:

1. A process for preparing a polyvinyl chloride resin of decreased absorptivity and increased heat stability especially suitable for use in preparing plastisols, said process comprising intimately mixing with an aqueous suspension of discrete particles of a polyvinyl chloride polymer a small proportion of at least one organo phosphate which is water-soluble or water-dispersible and has the general formula

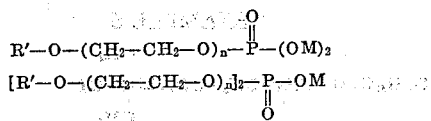

wherein R' is alkyl or alkyl-substituted phenyl, each alkyl group containing between about 1 and about 20 carbons, $n$ is an integer from 1 to 30 and M is an ammonium, alkali metal or alkaline-earth metal cation; said organo phosphate being added to the system during or after the occurrence of the pressure drop in the polymerization of the polyvinyl chloride polymer; and thereafter recovering the polymer particles from the aqueous system.

2. The process of claim 1 wherein the polyvinyl chloride suspension is a latex.

3. The process of claim 2 wherein the organo phosphate is introduced to the latex when the polymerization reaction is at least about 75% completed.

4. The process of claim 1 wherein R' is straight-chain alkyl or tertiary alkyl-substituted phenyl wherein the alkyls total about 1 to 12 carbons, and M is sodium or potassium.

5. The process of claim 2 wherein substantially between 0.05% and 5.0% by weight of the organo phosphate is added, based on the total polyvinyl chloride content of the latex.

References Cited

UNITED STATES PATENTS 2,853,471  9/1958  Beadell _____ 260—45.95
3,033,889  5/1962  Chiddix _____ 252—32.5
3,366,584  1/1968  Zimmerman _____ 260—887

DONALD E. CZAJA, Primary Examiner

V. P. HOKE, Assistant Examiner

U.S. Cl. X.R.

260—29.6 MP, 30.6 R, 31.8 R, 45.75, 45.7 P, 45.9, 92.8 W